United States Patent [19]

Fantone

[11] Patent Number: 4,480,893

[45] Date of Patent: Nov. 6, 1984

[54] OPTICAL AND VIEWING SYSTEM FOR STEREOSCOPIC PHOTOGRAPHY

[75] Inventor: Stephen D. Fantone, Saugus, Mass.

[73] Assignee: Polaroid Corporation, Cambridge, Mass.

[21] Appl. No.: 257,734

[22] Filed: Apr. 27, 1981

[51] Int. Cl.³ .................. G02B 27/26; G03B 21/00; G03B 35/06

[52] U.S. Cl. .................. 350/132; 352/57; 352/60; 353/8

[58] Field of Search .............. 350/130–132; 353/8; 352/57, 58, 60

[56] References Cited

U.S. PATENT DOCUMENTS

| | | | |
|---|---|---|---|
| 1,851,705 | 3/1932 | Herz | 352/57 |
| 3,013,468 | 12/1961 | Leach | 352/58 |
| 3,189,915 | 6/1965 | Tondreau | 352/60 |
| 3,494,270 | 2/1970 | Shibata | 354/115 X |
| 3,597,042 | 8/1971 | Favre | 352/43 X |
| 3,663,085 | 5/1972 | Davis | 350/132 |
| 3,731,606 | 5/1973 | Geoffray | 352/60 X |
| 3,824,609 | 7/1974 | Tevick | 354/102 |
| 3,895,867 | 7/1975 | Lo et al. | 355/77 |
| 3,960,563 | 6/1976 | Lo et al. | 350/131 X |
| 3,990,087 | 11/1976 | Marks et al. | 354/117 |
| 4,012,116 | 3/1977 | Yevick | 350/132 |
| 4,086,585 | 4/1978 | Wah Lo et al. | 354/115 |
| 4,111,695 | 9/1978 | Yevick | 350/132 X |
| 4,132,468 | 1/1979 | Lo et al. | 350/132 X |
| 4,295,153 | 10/1981 | Gibson | 352/60 X |

Primary Examiner—John K. Corbin
Assistant Examiner—Scott J. Sugarman
Attorney, Agent, or Firm—Francis J. Caufield

[57] ABSTRACT

A stereoscopic optical system for use in a camera to simultaneously photograph two separated views of a three-dimensional scene with lenticular type film and a viewing system by which the stereo pairs recorded on the lenticular film can be projected and combined on a screen so that they can be seen in proper stereo relief with spectacles having orthogonally polarized lenses. The stereoscopic optical system comprises a dual optical path for providing the two separated views of the scene. The two separated views of the scene are optically encoded through the use of orthogonal polarizers and are then combined to travel along a single system optical path through the use of a polarizing beamsplitter. An objective taking lens images the combined encoded scene views through an apertured polarizing mask which spatially separates the two separate views so that each travels along separate paths to the film. The film lenticules image the mask apertures onto the film while the objective lens images the scene so that the two separated scene views are recorded on the film as a series of interlaced image pairs behind each film lenticule. The viewer and spectacles are structured to optically reverse the process by which the three-dimensional aspects of the scene are recorded. Methods by which the optical system and viewer can be used are also included in the invention.

20 Claims, 5 Drawing Figures

OPTICAL AND VIEWING SYSTEM FOR STEREOSCOPIC PHOTOGRAPHY

BACKGROUND OF THE INVENTION

1. Field of the Invention

This invention in general relates to stereoscopic photography and in particular to an optical system for simultaneously recording stereo image pairs in lenticular type film and to a viewing system by which the stereo pairs recorded in the lenticular film can be projected onto a viewing screen and seen in proper stereo relief with spectacles having orthogonally polarized lenses.

2. Description of the Prior Art

Stereoscopic photography is well-known in the art and is based on the principle that two photographs of a subject, taken from viewpoints approximately separated by the interlocular distance of the human eye, will merge into one three-dimensional image of the subject if the photographs are viewed in such a way that each eye sees only the view appropriate to it. The two photographs of the separate views of the subject are sometimes referred to as a "stereo pair", and those skilled in the art have provided a variety of methods and associated apparatus for creating and reconstructing stereo pairs. For example, stereo pairs may be recorded separately on different pieces of film or on opposite halfs of a single piece of film and have been recorded sequentially and simultaneously using either film arrangement. With simultaneous methods of recording, however, subject motion is not a problem as it is with the sequential method. Therefore, simultaneous recording is usually preferred and has been accomplished by using identical cameras fixed together at the required distance and having their shutters synchronously released.

Cameras exclusively for use in stereoscopic photography are also well-known and typically have a pair of matched lenses with coupled focusing movements, diaphragms, and shutters to assure that the stereo pair is identical except for the separation of viewpoints. Beamsplitters in stereo cameras also have been employed with a single lens and here the usual arrangement is to have the separate views imaged by the objective lens on opposite halves of a single film frame.

It is also known to utilize two matched lenses to focus two images corresponding to separated views in the same film through a lenticular screen. Moreover, it is also known in the stereoscopic art to encode left and right views of a scene with orthogonal polarizers and to expose lenticular type film to such encoded light to create stereo pairs either in black and white or in color by exposing through appropriate filters.

However, none of the prior art appears to achieve the creation and reconstruction of stereo pairs by simultaneously encoding and recording on a lenticular type film a stereo pair using only a single objective lens and subsequently reconstructing the stereoscopic views still using only a single lens.

Therefore, it is a primary object of the present invention to provide an optical system by which a stereo pair can be simultaneously encoded and recorded on lenticular type film with the use of only a single objective lens and subsequently reconstructed with a viewer having only a single projection lens.

It is another object of the present invention to provide a stereoscopic motion picture camera and viewing system in which the stereo pair are perfectly synchronized and in which there is no image jitter.

Other objects of the invention will, in part, be obvious and will, in part, appear hereinafter. The invention accordingly comprises the apparatus possessing the construction, combination of elements, and arrangement of parts which are exemplified in the following detailed disclosure and the methods inherent in the use of the apparatus described.

SUMMARY OF THE INVENTION

This invention in general relates to stereoscopic photography and in particular to an optical system for simultaneously recording stereo image pairs on lenticular type film and to a viewing system by which the stereo image pairs recorded in the lenticular film can be projected onto a viewing screen and seen in proper stereo relief with spectacles having orthogonally polarized lenses.

The stereoscopic optical system of the invention comprises means for facilitating the positioning of the lenticular film in a plane for exposure.

Additionally included in the optical system are means for defining two separated optical paths along which light from a scene to be photographed can travel to provide two different views of the scene, for polarizing the scene light from each of the views in planes orthogonal to one another to encode the light from each view, and for combining the encoded scene light from each view and directing it to travel along a single optical path.

An objective taking lens is provided and is positioned along the single optical path for receiving the combined encoded scene light from both scene views and focusing this light on the film plane.

Also included in the optical system are means for defining at least one pair of laterally spaced apart apertures positioned ahead of the film in a plane located at or near the far conjugate of the film lenticules to provide at least one pair of spatially separated light paths along which the objective taking lens focuses light onto the film plane and for transmitting the encoded light from one view of the scene through one of the spatially separated apertures while transmitting the encoded light from the other view of the scene through the other aperture of the spatially separated aperture pair so that the film lenticules can form microscopic images of the light passing through each of the spatially separated apertures, aside of one another on the photosensitive layers of the film located behind each lenticule, whereby the views of the scene are imaged in the film as a series of interlaced paired image strips one of which corresponds to a part of one of the views of the scene and the other of which corresponds to a part of the other of the views of the scene.

The stereoscopic viewing system of the invention is for use in observing in stereo relief the two separated views of the scene recorded in the lenticular type film as a series of interlaced paired image strips located behind each film lenticule. For this purpose the viewing system of the invention is provided with means for facilitating the positioning of the lenticular film in a plane for projection.

Additionally provided are means for illuminating the lenticular film so that each image pair recorded therein is projected through a respective one of the film lenticules.

The viewing system also includes a substantially non-depolarizing screen for viewing images projected on the rear surface thereof and a projection lens mounted to receive light projected from the film lenticules and focus it on the rear surface of the viewing screen.

Means are also provided in the viewer for defining at least one pair of laterally spaced apart apertures positioned ahead of the film in a plane located at or near the far conjugate of the film lenticules to provide at least one pair of spatially separated light paths along which light projected from the film lenticules can travel toward the projection lens and for polarizing light from one view of the scene in one plane of polarization as it passes through one of the spatially separated apertures while polarizing the light from the other view of the scene in a plane orthogonal to the first plane as the light from the other view passes through the other aperture of the spatially separated aperture pair so that both views of the scene are combined by the projection lens on the viewing screen rear surface as orthogonally polarized images which can be viewed with spectacles having orthogonally polarized lenses whereby the separated views of the scene are seen in proper perspective to create a stereo relief of the scene.

In the preferred embodiment of the optical and viewing systems of the invention, the separated views of the scene are encoded through the use of orthogonal linear polarizers and the spatially separated apertures are formed as a pair of parallel slits in a mask which is preferably positioned at or near the aperture stop or at or near the entrance or exit pupils of the optical system objective taking lens and the viewer projection lens.

Methods are also included by which the optical system and viewing system elements are utilized to create and reconstruct stereo image pairs utilizing lenticular type film.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiments when read in connection with the accompanying drawings wherein like numbers have been employed in the different figures to denote the same parts and wherein:

DESCRIPTION OF THE PREFERRED EMBODIMENT

This invention in general relates to stereoscopic photography and in particular to an optical system for simultaneously recording stereo image pairs of a scene in lenticular type film and to a viewing system by which the stereo image pairs recorded in the lenticular film can be projected onto a viewing screen and seen in proper stereo relief with spectacles having orthogonally polarized lenses.

Figure 1:
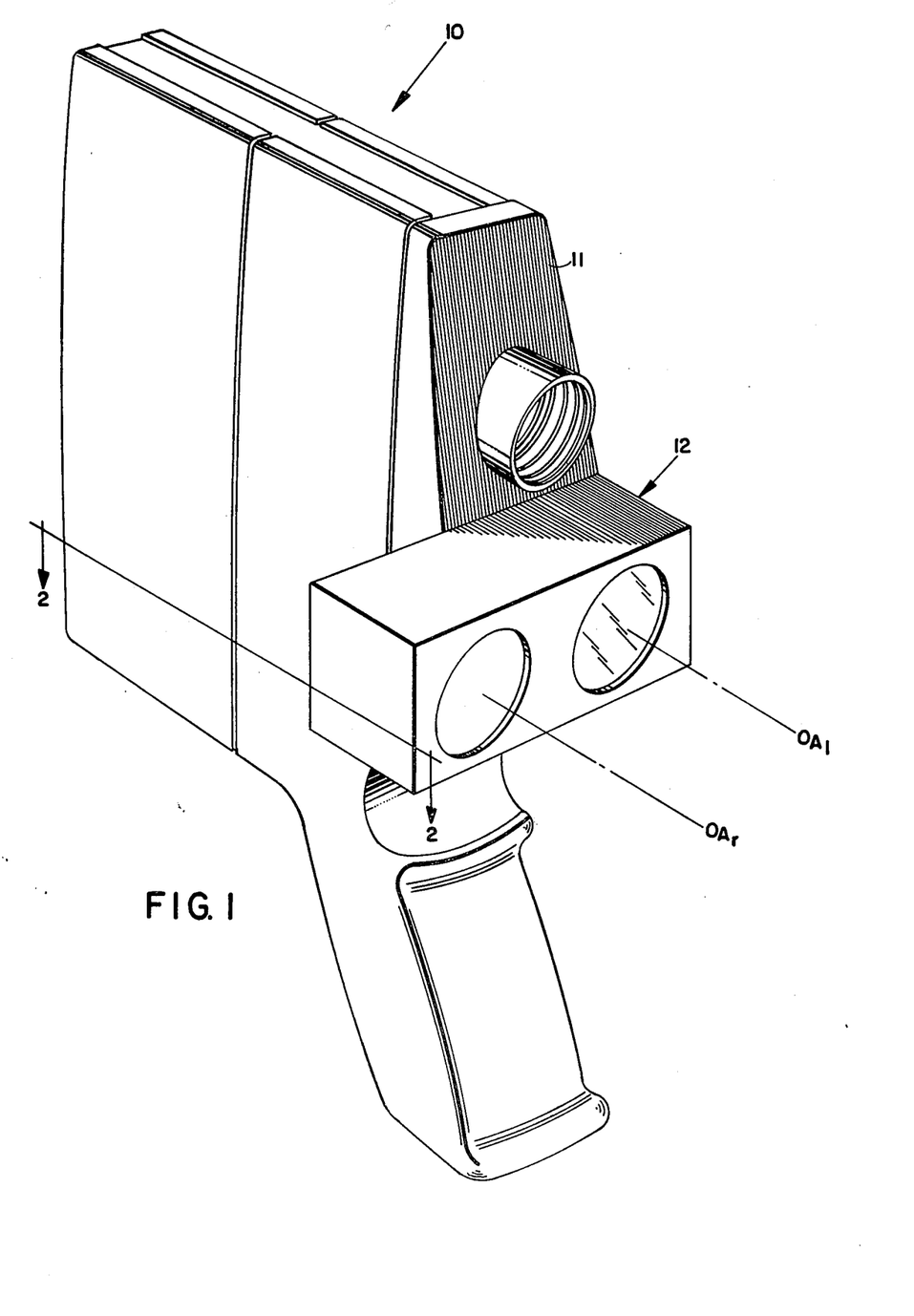
FIG. 1 is a left front perspective view of a camera embodying the optical system of the present invention.
Figure 4:
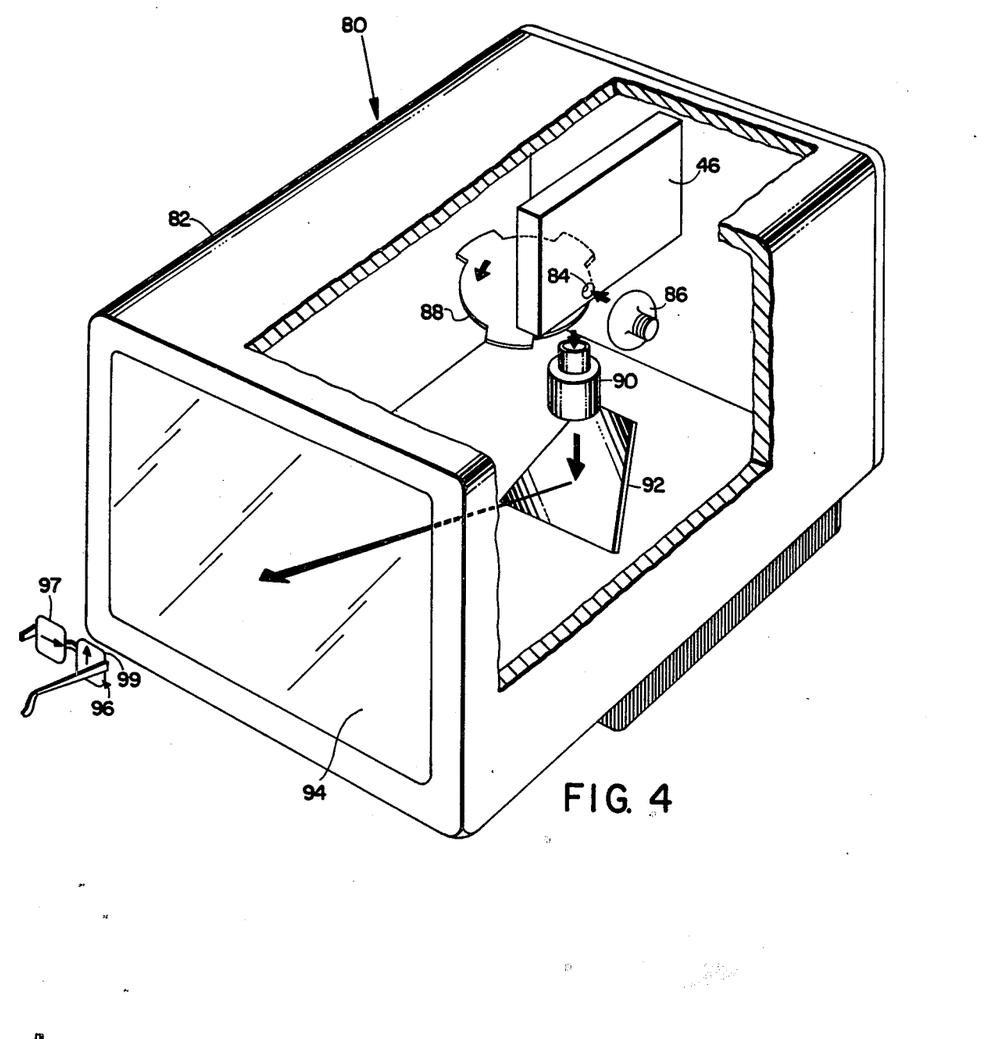
FIG. 4 is a diagrammatic perspective view, with parts broken away, of the viewing system of the invention.

The optical system of the invention is shown incorporated in a well-known motion picture camera designated at 10 in FIG. 1, and the viewing system of the invention is incorporated in a well-known viewer designated at 80 in FIG. 4. The motion picture camera 10 and the viewer 80 may be any of a number of well-known types but, as illustrated, represent Polaroid Corporation's Polavision Land Movie System, the camera and viewer of which require only simple and slight modification to accept the invention to be described hereinafter to allow the taking and projection of stereo movies with lenticular type film. Consequently, only those features of the camera 10 and the viewer 80 which form part of the invention will be described in detail, and it can be assumed that other features of the camera 10 and the viewer 80, such as exposure control systems, film transport systems, illumination systems and the like, are conventional and will only be described where they add to the understanding of the present invention.

The optical system of the invention by which the camera 10 can be adapted to simultaneously photograph two separated views of a three-dimensional scene with lenticular type film will now be described with reference to FIGS. 1 and 2 wherein it can be seen that the camera 10 includes a forward wall 11 having extending therefrom a generally rectangularly-shaped housing section 12. Formed in the camera forward wall 11 is a circular recess 13 in which there is formed a circular aperture 14 for admitting light into the interior of the camera 10. A short cylindrical tubular section 16 surrounds the circular recess 13, extending outwardly therefrom to facilitate mounting the rectangularly-shaped housing 12 to tne camera forward wall 11.

Mounted in axial alignment with the circular recess 13 is a flanged lens mount 18 that is structured to fit into the circular recess 13. The forward end of the lens mount 24 has a circular recess 20 having an aperture 22 formed therethrough into which an objective taking lens, shown diagrammatically at 24, fits. The objective taking lens 24 may be any well-known type suited for motion picture cameras but is preferably a four-element, air-spaced lens of the type described, for example, in U.S. Pat. No. 3,001,401 issued to Irving C. Sandbach on Dec. 5, 1961 and entitled "Optical Objective"; U.S. Pat. No. 3,001,402 issued to Walter J. Johnson on Dec. 5, 1961 and entitled "Optical Objective"; or U.S. Pat. No. 3,074,316 issued to Arthur Cox et al. on Jan. 22, 1963 and entitled "Highly Corrected Optical Objective".

The objective taking lens 24 has an optical axis, $OA_t$, therethrough along which there is provided, behind the objective taking lens 24, a well-known film cassette receiving chamber which is not shown in its entirety but forms a part of the camera 10 and includes a wall 48 having an aperture 50 therein behind which is positioned a film cassette 46. In the film cassette 46, there is disposed a lenticular type film 52. The lenticular type film 52 is aligned with the aperture 50 so that it may be exposed to scene light emanating from the objective taking lens 24. In this manner means are provided for facilitating the positioning of the lenticular film 52 in a plane for exposure.

The lenticular type film 52 as best shown in FIG. comprises a lenticular screen having a series of parallel cylindrical type lenticules 54 behind which is positioned photosensitive layers of the film 52 which layers are arranged on the top surface of a transparent substrate 56 onto which the lenticules 54 focus light in a well-known manner. The photochemical system of the lenticular film 52 may take on a variety of forms such as an additive or a subtractive color transparency system or a black and white transparency. In addition, the lenticular film 52 may be of the self-processable type or may be of the type which can be processed in a conventional manner. For purposes of the present description of the preferred embodiment it may be assumed that the lenticular type film 52 is either a black and white or subtractive color transparency which is of the self-processable type and upon development yields a positive transparency either in black and white or color. However, the lenticular film 52 could also be an additive type color transparency system which yields a positive transparency, and in this case, the optical system of the invention would have to be slightly modified as will be described hereinafter.

The lenticules 54 formed in the film 52 may be made in a variety of well-known manners as that, for example, described in an article by Edwin H. Land in *Photographic Science and Engineering*, vol. 21, No. 5, September/October 1977 and entitled "An Introduction To Polavision". For purposes of the preferred embodiment the lenticules 54 are provided with a back focal length of approximately 0.003 inches and have a spatial frequency of 1500 lenticules per inch.

Figures 2, 3:
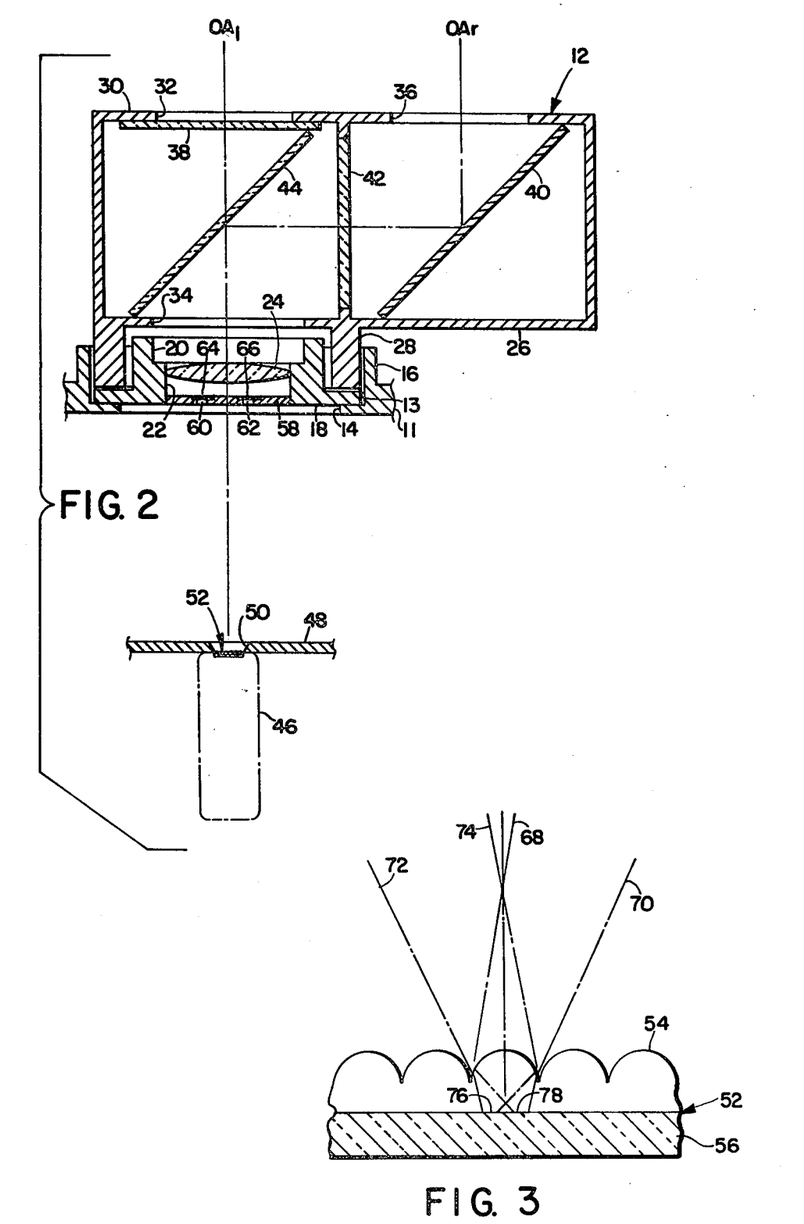
FIG. 2 is a sectional view of the camera of FIG. 1 illustrating the optical system of the invention and taken generally along line 2—2 of FIG. 1.
FIG. 3 is an enlarged fragmentary view of a lenticular type film shown in section in FIG. 2.

Referring now to FIG. 2, it can be seen that the camera rectangularly-shaped front housing 12 includes a rear wall 26 and a forward wall 30 spaced ahead of the rear wall 26. Extending rearwardly from the rear wall 26 is a circularly shaped tubular section 28 that is structured to fit between the lens mount 18 and the tubular section 16 which surrounds the camera forward wall recess 13. With the foregoing structure and conventional fasteners, the camera front housing 12 attaches to the camera forward wall 11.

Located in the front housing forward wall 30 is an aperture 32 that is aligned with the optical axis, $OA_l$, and in the front housing rear wall 26, there is an aperture 34 that is aligned with the aperture 32 and also arranged along the optical axis, $OA_l$. To the right of the aperture 32 and centered along an optical axis, $OA_r$, there is provided in the front housing wall 30 another aperture 36 which is spaced away from the aperture 32 by the interocular distance separating the human eyes. In this manner, there is provided in the optical system of the invention means for defining two separated optical paths along which light from a scene to be photographed can travel to provide two different views of the scene.

Overlying the aperture 32 is a linear polarizer 38 that encodes the light from the view of the scene passing through the aperture 32. A plane mirror 40 is arranged at approximately 45° to the optical axis, $OA_r$, to receive light traveling through the aperture 36 to redirect it approximately 90°. The exact angle at which the mirror 40 is arranged with respect to the optical axis, $OA_r$, is selected in a well-known manner to give a desired parallax when projected. The light reflected from the mirror 40 passes through another plane polarizer 42 which has an axis of polarization that is orthogonal to that of the polarizer 38 so that the light received from the two views of the scene corresponding to the optical axes, $OA_l$ and $OA_r$ respectively, is orthogonally polarized.

Behind the aperture 32 is a polarizing beamsplitter 44 that is arranged at 45° with respect to the optical axis, $OA_l$. The polarizing beamsplitter 44 operates in a well-known manner to transmit plane polarized light emerging from the polarizer 38 and to reflect the orthogonally polarized light emerging from the polarizer 42 so that the light from the two views of the scene travel along the optical axis, $OA_l$. In this manner there is provided means for combining the encoded scene light from each view of the scene and directing it to travel along a single optical path, $OA_l$, to the objective taking lens 24. The objective taking lens 24 operates to receive the combined encoded scene light from both of the views of the scene and focus it onto the lenticular film 52. Any optical path length differences may be corrected in a well-known manner.

Mounted in registration with the lens mount aperture 22, there is a mask 58 having formed therein a pair of parallel slits, 60 and 62, which provide a pair of laterally spaced apart apertures through which the light emerging from the objective taking lens 24 can travel to the lenticular film 52. The mask apertures, 60 and 62, are positioned ahead of the film 52 in a plane located preferably at or near the far conjugate of the film lenticules 54 to provide at least one pair of spatially separated light paths along which the objective taking lens focuses light onto the film 52.

In registration with the aperture 60 there is provided a plane polarizer which has a plane of polarization corresponding to the plane in which light is polarized from one of the views of the scene so that only light polarized in that plane can pass through the aperture 60. Similarly, a polarizer 66 is mounted in registration with the aperture 62 and has a plane of polarization arranged orthogonal to that of the polarizer 64 so that only light from the remaining view of the scene can be transmitted through the aperture 62.

The geometric arrangement of the apertures 60, and 62, and the optical properties of the film lenticules 54 are structured in a well-known manner so that each film lenticule 54 forms a microscopic image of the light passing through each of the spatially separated apertures, 60 and 62, aside of one another and preferably without overlap on the photosensitive layers of the film 52 located behind each lenticule 54. This is illustrated in FIG. 3 with exemplary rays identified at 72 and 74, emanating from the aperture 60, being focused in an area designated generally at 78 behind one of the individual lenticules 54. Rays 68 and 70 are exemplary rays from the aperture 62 and in FIG. 3 it can be seen that the individual lenticule represented focuses the light passing through the aperture 62 on an area designated generally at 76 wherein a microscopic image of the other view of the scene is formed. The apertures 60 and 62 thus act as field stops for each lenticule 54 limiting the view each lenticule has to a predetermined part of each view of the scene, and also physically separate each scene view so that only selectively polarized light can be transmitted through each aperture, 60 and 62. In this manner, each separate view of the scene as imaged in the film 52 is a series of interlaced paired image strips, one of which corresponds to a part of one of the views of the scene and the other of which corresponds to a part of the other view of the scene.

In addition to the mask 58 being positioned at the far conjugate of the lenticules 54, it is preferable to locate the mask 58 at the aperture stop of the objective taking lens 24, or at its entrance or exit pupil which are images of its aperture stop, for the purpose of preventing vignetting of either view of the scene.

In the event that the lenticular film 52 had an additive color system of the type having red, green and blue filter stripes, one each arranged in parallel fashion behind a respective lenticule, it would then be necessary for the mask 58 to have three sets of laterally spaced apart apertures and these would operate in the same manner as the apertures 60 and 62. Having described the manner in which the stereoscopic optical system of the invention can be used to photograph three dimensional scenes on lenticular type film, the stereoscopic viewer 80 of the invention and the manner in which it can be used to observe in stereo relief the two separated views of the scene recorded in the lenticular film 52 will now be described with reference to FIGS. 4 and 5.

The stereoscopic viewer 80 comprises a generally rectangular shaped housing 82 in which are disposed, but not shown, conventional means for receiving the film cassette 46 to facilitate the positioning of the lenticular film 52 in a plane for projection. Also included is a conventional illumination system which includes a lamp 86 and a shuttering wheel 88. The lamp 86 illuminates an aperture 84 in the film cassette 46. In the aperture 84 there is positioned a prismatic optical element by which the light from the lamp 86 is redirected and projected through the transparent film base 56 of the film 52 so that the images contained in the film 52 are directed along a path to a projection lens 90 (black arrows). Examples of the film cassette 46 and of the prismatic optical element therein may be seen in, for example, U.S. Pat. No. 3,917,392 issued to Herbet A. Bing on Nov. 4, 1975 and entitled "Unique Prismatic Element And Projection System" and in U.S. Pat. No. 3,860,329 issued to Philip G. Baker et al. on Jan. 14, 1975 and entitled "Unique Prismatic Element And Mounting Arrangement Therefor".

The projection lens 90 is of the type described in considerable detail in, for example, U.S. Pat. No. 2,989,895 issued to I. C. Sandbach on June 27, 1961 and entitled "Optical Objective" and operates to receive light emanating from the lenticules 54 of the film 52 to project that light onto a non-depolarizing screen 94 via a plane mirror 92 that is provided for well-known reasons to create one image reversal which is necessary for proper image orientation. The translucent projection screen 94 is of the type more fully described in U.S. Pat. No. 4,184,745 issued to Edwin H. Land on Jan. 22, 1980 and entitled "Translucent Screen" and in U.S. Pat. No. 4,136,935 issued to Gerald H. Cook et al. on Jan. 30, 1979 and entitled "Rear Projection Viewer Having Auxiliary Viewing Screen". For a description of other conventional features of the viewer 80 reference may be had to, for example, U.S. Pat. No. 3,851,958 issued to Edwin H. Land on Dec. 3, 1974 and entitled "Photographic System For Processing And Projecting Transparencies".

Figure 5:
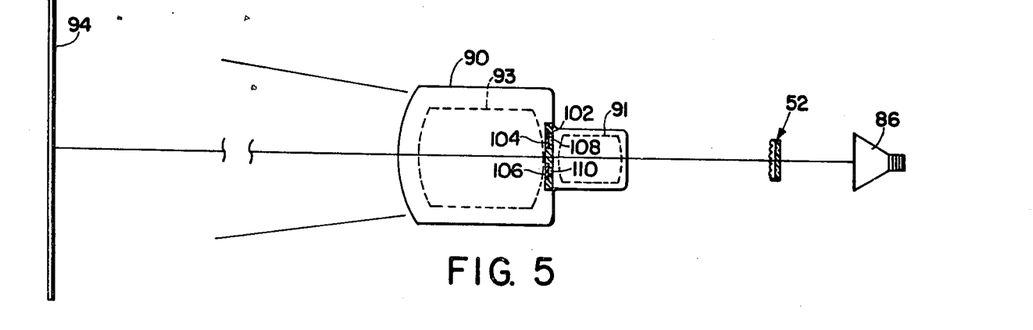
FIG. 5 is an elevational view representing in diagrammatic fashion the optical layout of the viewing system of FIG. 4.

Referring now to FIG. 5, which is a diagrammatic layout of the optical system of the viewer 80 not including the mirror 92, there is provided a mask 102 which is located between a pair of lens cells 91 and 93 which comprise the projection lens 90. The mask 102 has a pair of apertures 108 and 110 therein. The apertures 108 and 110 are spatially separated and are spaced ahead of the lenticular film 52 by a distance which is located at or near the far conjugate of the film lenticules 54. Mounted in registration with the aperture 108 is a plane polarizer 104 and, in registration with the aperture 110, another plane polarizer 106 which has an axis of transmission that is orthogonal to that of the polarizer 104. Arranged in this manner, the apertures 108 and 110 in the mask 102 appear to the lenticules of the film 52 to be optically in the same place as they were in when exposed to the two separated views of the scene with the camera 10. Thus, the mask 102 in combination with the polarizers 104 and 106 operate to provide a pair of spatially separated light paths along which light projected from the film lenticules 54 can travel through the projection lens 90 except in the reverse of the manner in which the two views of the scene were recorded. Thus light from one view of the scene is polarized in one plane of polarization as it passes through one of the spatially separated apertures, 104 or 106, while light from the other view of the scene is orthogonally polarized as it passes through the other aperture, 104 or 106, so that both views of the scene are combined by the projection lens 90 on the rear surface of the screen 94 as orthogonally polarized (right and left) views of the scene. These orthogonally polarized right and left views of the scene can be viewed with a pair of spectacles 96 having orthogonally polarized lenses 97 and 99 whereby the separated views of the scene are seen in proper perspective to create a stereo relief of the scene.

Again, if the lenticular type film 52 were an additive color type system having a series of color filter stripes associated with the lenticules 54, then it would be necessary to provide in the mask 102 as many pairs of apertures as there were color filters in the film. Also, it is preferable that the mask 102 be located at or near the aperture stop of the projection lens 90 or at or near its entrance or exit pupils whichever is more convenient.

The methods inherent in the use of the optical taking system and viewing systems of the invention are within the scope of the invention and it will be obvious to those skilled in the art that other changes may be made in the above-described embodiments without departing from the scope of the invention. For example, it can be appreciated that the invention can be utilized to take still photographs and that conventional film can be used provided the function of the lenticules is incorporated in the camera 10 and the viewer 80 as a permanent lenticular screen appropriately positioned over the film exposure plane. Therefore, it is intended that all matter contained in the above description or shown in the accompanying drawings shall be interpreted as illustrative and not in a limiting sense.

What is claimed is:

1. A stereoscopic optical system for use in photographing three-dimensional scenes with lenticular type film, said optical system comprising:

means for facilitating the positioning of the lenticular film in a plane for exposure;

means for defining two separated optical paths along which light from a scene to be photographed can travel to provide two different views of the scene, for polarizing the scene light from each of said views in planes orthogonal to one another to encode the light from each of said views, and for combining the encoded scene light from each view and directing it to travel along a single optical path;

an objective taking lens positioned along said signal optical path for receiving the combined encoded scene light from both of said scene views and focusing said light on said film plane; and means for defining at least one pair of laterally spaced apart apertures positioned ahead of the film in a plane located at or near the far conjugate of the film lenticules, along said single optical path, and proximate the stop of said objective lens to provide at least one pair of spatially separated light paths along which said objective taking lens focuses light onto said film plane and for transmitting without vignetting said encoded light from one view of the scene through one of said spatially separated apertures while transmitting without vignetting said encoded light from the other view of the scene through the other aperture of said spatially separated aperture pair so that the film lenticules can form microscopic images of the light passing through each of said spatially separated apertures, aside of one another on the photosensitive layers of the film located behind each lenticule, whereby said views of the scene are imaged in the film as a series of interlaced paired image strips one of which corresponds to a part of one of said views of the scene and the other of which corresponds to a part of the other of said views of the scene.

2. The system of claim 1 wherein said last-stated means comprises a mask having formed therein at least one pair of parallel slits for providing said pair of laterally spaced apart apertures and a pair of orthogonal linear polarizers one each of which is positioned in light intercepting relationship with respect to said slits so that only one encoded view of the scene is transmitted through each of said slits.

3. The system of claim 2 wherein said mask is positioned at or near the aperture stop of said objective taking lens or alternatively at or near the entrance or exit pupil of said objective taking lens.

4. The system of claims 1 or 2 wherein said second stated means comprises:
(a) a first polarizer positioned along one of said separated light paths for linearly polarizing the light from one of said scene views in one plane;
(b) a second polarizer positioned along the other of said separated light paths for linearly polarizing the light from the other of said scene views in a plane orthogonal to that of said one plane; and
(c) a plane mirror and a beamsplitting polarizer for combining said orthogonally polarized scene light from said separated views and directing it to travel along said single optical path.

5. A stereoscopic optical system for use in photographing three-dimensional scenes, said system comprising:
means for facilitating the positioning of the film in a plane for exposure;
a lenticular screen of predetermined optical configuration overlying said film exposure plane;
means for defining two separated optical paths along which light from a scene to be photographed can travel to provide two different views of the scene, for polarizing the scene light from each of said views in planes orthogonal to one another to encode the light from each of said views, and for combining the encoded scene light from each view and directing it to travel along a single optical path;
an objective taking lens positioned along said single optical path for receiving the combined encoded scene light from both of said scene views and focusing said light on said film plane; and
means for defining at least one pair of laterally spaced apart apertures positioned ahead of the film in a plane located at or near the far conjugate of said screen lenticules, along said single optical path, and proximate the stop of said objective lens to provide at least one pair of spatially separated light paths along which said objective taking lens focuses light onto said film plane and for transmitting without vignetting said encoded light from one view of the scene through one of said spatially separated apertures while transmitting without vignetting said encoded light from the other view of the scene through the other aperture of said spatially separated aperture pair so that said screen lenticules can form microscopic images of the light passing through each of said spatially separated apertures, aside of one another on the photosensitive layers of the film located behind each lenticule, whereby said views of the scene are imaged in the film as a series of interlaced paired image strips one of which corresponds to a part of one of said views of the scene and the other of which corresponds to a part of the other of said views of the scene.

6. The system of claim 5 wherein said last-stated means comprises a mask having formed therein at least one pair of parallel slits for providing said pair of laterally spaced apart apertures and a pair of orthogonal linear polarizers one each of which is positioned in light intercepting relationship with respect to said slits so that only one encoded view of the scene is transmitted through each of said slits.

7. The system of claim 6 wherein said mask is positioned at or near the aperture stop of said objective taking lens or alternatively at or near the entrance or exit pupil of said objective taking lens.

8. The system of claims 5 or 6 wherein said second stated means comprises:
(a) a first polarizer positioned along one of said separated light paths for linearly polarizing the light from one of said scene views in one plane;
(b) a second polarizer positioned along the other of said separated light paths for linearly polarizing the light from the other of said scene views in a plane orthogonal to that of said one plane; and
(c) a plane mirror and a beamsplitting polarizer for combining said orthogonally polarized scene light from said separated views and directing it to travel along said single light path.

9. A stereoscopic viewer for use in observing in stereo relief two separated views of a scene recorded in lenticular type film as a series of interlaced paired image strips located behind each film lenticule wherein one of each of the image pairs behind each lenticule corresponds to a part of one of the views of the scene and the other corresponds to a part of the other view of the scene, said viewer comprising:
means for facilitating the positioning of the lenticular film in a plane for projection;
means for illuminating the lenticular film so that each image pair recorded therein is projected through a respective one of the film lenticules;
a substantially non-depolarizing screen for viewing images projected on the rear surface thereof;
a projection lens mounted to receive light projected from the film lenticules and focus it on said rear surface of said screen; and
means for defining at least one pair of laterally spaced apart apertures positioned ahead of the film in a plane located at or near the far conjugate of the film lenticules to provide at least one pair of spatially separated light paths along which light projected from the film lenticules can travel toward said projection lens unvignetted and for polarizing light from one view of the scene in one plane of polarization as it passes through one of said spatially separated apertures while polarizing the light from the other view of the scene in a plane orthogonal to said one plane as it passes through the other aperture of said spatially separated aperture pair so that both views of the scene are combined by said projection lens on said screen rear surface as orthogonally polarized images which can be viewed with spectacles having orthogonally polarized lenses whereby the separated views of the scene are seen in proper perspective to create a stereo relief of the scene.

10. The system of claim 9 wherein said last-stated means comprises a mask having formed therein at least one pair of parallel slits for providing said pair of laterally spaced apart apertures and a pair of orthogonal linear polarizers one each of which is positioned in light intercepting relationship with respect to said slits so that only one encoded view of the scene is transmitted through each of said slits.

11. The system of claim 10 wherein said mask is positioned at or near the aperture stop of said objective taking lens or alternatively at or near the entrance or exit pupil of said objective taking lens.

12. A stereoscopic viewer for use in observing in stereo relief two separated views of a scene recorded in film as a series of interlaced paired images wherein one of each of the image pairs corresponds to a part of one of the views of the scene and the other corresponds to a part of the other view of the scene, said viewer comprising:
  means for facilitating the positioning of the film in a plane for projection;
  a lenticular screen of predetermined optical configuration positioned in overlying relationship to said film exposure plane and aligned with the film so that each of the film image pairs is located behind a lenticule of said screen;
  means for illuminating the film so that each image pair recorded in the film is projected through a respective one of said screen lenticules;
  a substantially non-depolarizing screen for viewing images projected on the rear surface thereof;
  a projection lens mounted to receive light projected from said screen lenticules and focus it on said rear surface of said screen; and
  means for defining at least one pair of laterally spaced apart apertures positioned ahead of said lenticular screen in a plane located at or near the far conjugate of said screen lenticules to provide at least one pair of spatially separated light paths along which light projected from said screen lenticules can travel toward said projection lens unvignetted and for polarizing light from one view of the scene in one plane of polarization as it passes through one of said spatially separated apertures while polarizing the light from the other view of the scene in a plane orthogonal to said one plane as it passes through the other aperture of said spatially separated aperture pair so that both views of the scene are combined by said projection lens on said screen rear surface as orthogonally polarized images which can be viewed with spectacles having orthogonally polarized lenses whereby the separated views of the scene are seen in proper perspective to create a stereo relief of the scene.

13. The system of claim 12 wherein said last-stated means comprises a mask having formed therein at least one pair of parallel slits for providing said pair of laterally spaced apart apertures and a pair of orthogonal linear polarizers one each of which is positioned in light intercepting relationship with respect to said slits so that only one encoded view of the scene is transmitted through each of said slits.

14. The system of claim 13 wherein said mask is positioned at or near the aperture stop of said projection lens or alternatively at or near the entrance or exit pupil of said objective taking lens.

15. A method for photographing three-dimensional scenes with lenticular type film to create a sterographic picture, said method comprising the steps of:
  positioning lenticular film in a plane for exposure;
  providing two separated optical paths along which light from a scene to be photographed can travel to provide two different views of the scene, polarizing the scene light from each of said views in planes orthogonal to one another to encode the light from each of said veiws, and combining the encoded scene light from each view and directing it to travel along a single optical path;
  positioning an objective taking lens along said single optical path for receiving the combined encoded scene light from both of said scene views and focusing said light on said film plane;
  positioning at least one pair of laterally spaced apart apertures ahead of the film in a plane located at or near the far conjugate of the film lenticules, along said single optical path, and proximate said objective lens to provide at least one pair of spatially separated light paths along which said objective taking lens focuses light onto said film plane such that encoded light from one view of the scene is transmitted without vignetting through one of said spatially separated apertures while encoded light from the other view of the scene is transmitted without vignetting through the other aperture of said spatially separated aperture pair whereby the film lenticules form microscppic images of the light passing through each of said spatially separated apertures, aside of one another on the photosensitive layers of the film located behind each lenticule, so that said views of the scene are imaged in the film as a series of interlaced paired image strips one of which corresponds to a part of one of said views of the scene and the other of which corresponds to a part of the other of said views of the scene; and exposing the film.

16. A method for photographing three-dimensional scenes on film to create a stereographic picture, said method comprising the steps of:
  positioning film in a plane for exposure;
  placing a lenticular screen of predetermined optical configuration in overlying relationship to the film;
  providing two separated optical paths along which light from a scene to be photographed can travel to provide two different views of the scene, polarizing the scene light from each of said views in planes orthogonal to one another to encode the light from each of said views, and combining the encoded scene light from each view and directing it to travel along a single optical path;

positioning an objective taking lens along said single optical path for receiving the combined encoded scene light from both of said scene views and focusing said light on said film plane;

positioning at least one pair of laterally spaced apart apertures ahead of said lenticular screen in a plane located at or near the far conjugate of said screen lenticules, along said single optical path, and proximate the stop of said objective lens to provide at least one pair of spatially separated light paths along which said objective taking lens focuses light onto said film plane such that encoded light from one view of the scene is transmitted without vignetting through one of said spatially separated apertures while encoded light from the other view of the scene is transmitted without vignetting through the other aperture of said spatially separated aperture pair whereby said screen lenticules form microscopic images of the light passing through each of said spatially separated apertures, aside of one another on the photosensitive layers of the film located behind each lenticule, so that said views of the scene are imaged in the film as a series of interlaced paired image strips one of which corresponds to a part of one of said views of the scene and the other of which corresponds to a part of the other of said views of the scene; and exposing the film.

17. A method for observing in stereo relief two separated views of a scene recorded in lenticular type film as a series of interlaced paired image strips located behind each film lenticule wherein one of each of the image pairs behind each lenticule corresponds to a part of one of the views of the scene and the other corresponds to a part of the other view of the scene comprising the steps of:

positioning the lenticular film in a plane for projection;

illuminating the lenticular film so that each image pair recorded therein is projected through a respective one of the film lenticules;

providing at a predetermined location with respect to the film a substantially non-depolarizing screen for viewing images projected on the rear surface thereof;

mounting a projection lens to receive light projected from the film lenticules and to focus it on said rear surface of said screen; and positioning at least one pair of laterally spaced apart apertures ahead of the film in a plane located at or near the far conjugate of the film lenticules to provide at least one pair of spatially separated light paths along which light projected from the film lenticules can travel toward said projection lens unvignetted and polarizing light from one view of the scene in one plane of polarization as it passes through one of said spatially separated apertures while polarizing the light from the other view of the scene in a plane orthogonal to said one plane as it passes through the other aperture of said spatially separated aperture pair so that both views of the scene are combined by said projection lens on said viewing screen rear surface as orthogonally polarized images which can be viewed with spectacles having orthogonally polarized lenses whereby the separated views of the scene are seen in proper perspective to create a stereo relief of the scene.

18. A method for observing in stereo relief two separated views of a scene recorded in film as a series of interlaced paired image strips wherein one of each of the image pairs corresponds to a part of one of the views of the scene and the other corresponds to a part of the other view of the scene comprising the steps of:

positioning the film in a plane for projection;

placing a lenticular screen of predetermined optical configuration in overlying relationship to the film so that each of the film paired images is aligned with a screen lenticule;

illuminating the film so that each image pair recorded therein is projected through a respective one of said screen lenticules;

providing at a predetermined location with respect to the film a substantially non-depolarizing screen for viewing images projected on the rear surface thereof;

mounting a projection lens to receive light projected from said screen lenticules and to focus it on said rear surface of said screen; and positioning at least one pair of laterally spaced apart apertures ahead of said lenticular screen in a plane located at or near the far conjugate of said screen lenticules to provide at least one pair of spatially separated light paths along which light projected from said screen lenticules can travel toward said projection lens unvignetted and polarizing light from one view of the scene in one plane of polarization as it passes through one of said spatially separated apertures while polarizing the light from the other view of the scene in a plane orthogonal to said one plane as it passes through the other aperture of said spatially separated aperture pair so that both views of the scene are combined by said projection lens on said viewing screen rear surface as orthogonally polarized images which can be viewed with spectacles having orthogonally polarized lenses whereby the separated views of the scene are seen in proper perspective to create a stereo relief of the scene.

19. A method for photographing three-dimensional scenes with lenticular type film to create a stereographic picture in which two separated views of a scene are recorded in the film as a series of interlaced paired image strips located behind each film lenticule and for viewing in stereo relief the two separated views of the scene, said method comprising the steps of:

positioning lenticular film in a plane for exposure;

providing two separated optical paths along which light from a scene to be photographed can travel to provide two different views of the scene, polarizing the scene light from each of said views in planes orthogonal to one another to encode the light from each of said views, and combining the encoded scene light from each view and directing it to travel along a single optical path;

positioning an objective taking lens along said single optical path for receiving the combined encoded scene light from both of said scene views and focusing said light on said film plane;

positioning at least one pair of laterally spaced apart apertures ahead of the film in a plane located at or near the far conjugate of the film lenticules along said single optical path, and proximate the stop of said objective lens to provide at least one pair of spatially separated light paths along which said objective taking lens focuses light onto said film plane such that encoded light from one view of the scene is transmitted without vignetting through one of said spatially separated apertures while encoded light from the other view of the scene is transmitted without vignetting through the other aperture of said spatially separated aperture pair whereby the film lenticules form microscopic images of the light passing through each of said spatially separated apertures, aside of one another on the photosensitive layers of the film located behind each lenticule, so that said views of the scene are imaged in the film as a series of interlaced paired image strips one of which corresponds to a part of one of said views of the scene and the other of which corresponds to a part of the other of said views of the scene; and exposing and processing the film;

positioning the processed lenticular film in a plane for projection;

illuminating the lenticular film so that each image pair recorded therein is projected through a respective one of the film lenticules;

providing at a predetermined location with respect to the film a substantially non-depolarizing screen for viewing images projected on the rear surface thereof;

mounting a projection lens to receive light projected from the film lenticules and to focus it on said rear surface of said screen; and positioning at least one pair of laterally spaced apart apertures ahead of the film in a plane located at or near the far conjugate of the film lenticules to provide at least one pair of spatially separated light paths along which light projected from the film lenticules can travel toward said projection lens unvignetted and polarizing light from one view of the scene in one plane of polarization as it passes through one of said spatially separated apertures while polarizing the light from the other view of the scene in a plane orthogonal to said one plane as it passes through the other aperture of said spatially separated aperture pair so that both views of the scene are combined by said projection lens on said viewing screen rear surface as orthogonally polarized images which can be viewed with spectacles having orthogonally polarized lenses whereby the separated views of the scene are seen in proper perspective to create a stereo relief of the scene.

20. A method for photographing three-dimensional scenes with film to create a stereographic picture in which two separated views of a scene are recorded in the film as a series of interlaced paired image strips lenticule and for viewing in stereo relief the two separated views of the scene, said method comprising the steps of:

positioning film in a plane for exposure;

placing a lenticular screen of predetermined optical configuration in overlying relationship to the film;

providing two separated optical paths along which light from a scene to be photographed can travel to provide two different views of the scene, polarizing the scene light from each of said views in planes orthogonal to one another to encode the light from each of said views, and combining the encoded scene light from each view and directing it to travel along a single optical path;

positioning an objective taking lens along said single optical path for receiving the combined encoded scene light from both of said scene views and focusing said light on said film plane;

positioning at least one pair of laterally spaced apart apertures ahead of said lenticular screen in a plane located at or near the far conjugate of said screen lenticules along said single optical path, and proximate the stop of said objective lens to provide at least one pair of spatially separated light paths along which said objective taking lens focuses light onto said film plane such that encoded light from one view of the scene is transmitted without vignetting through one of said spatially separated apertures while encoded light from the other view of the scene is transmitted without vignetting through the other aperture of said spatially separated aperture pair whereby said screen lenticules form microscopic images of the light passing through each of said spatially separated apertures, aside of one another on the photosensitive layers of the film located behind each lenticule, so that said views of the scene are imaged in the film as a series of interlaced paired image strips one of which corresponds to a part of one of said views of the scene and the other of which corresponds to a part of the other of said views of the scene; and exposing and processing the film;

positioning the processed lenticular film in a plane for projection;

placing a lenticular screen of predetermined optical configuration in overlying relationship to the film so that each of the film image pairs aligns with one of said screen lenticules;

illuminating the film so that each image pair recprded therein is projected through a respective one of the film lenticules;

providing at a predetermined location with respect to the film a substantially non-depolarizing screen for viewing images projected on the rear surface thereof;

mounting a projection lens to receive light projected from said screen lenticules and to focus it on said rear surface of said screen; and positioning at least one pair of laterally spaced apart apertures ahead of said lenticular screen in a plane located at or near the far conjugate of said screen lenticules to provide at least one pair of spatially separated light paths along which light projected from said screen lenticules can travel toward said projection lens unvignetted and polarizing light from one view of the scene in one plane of polarization as it passes through one of said spatially separated apertures while polarizing the light frtom the other view of the scene in a plane orthogonal to said one plane as it passes through the other aperture of said spatially separated aperture pair so that both views of the scene are combined by said projection lens on said viewing screen rear surface as orthogonally polarized images which can be viewed with spectacles having orthogonally polarized lenses whereby the separated views of the scene are seen in proper perspective to create a stereo relief of the scene.

* * * * *